June 16, 1959
L. A. BIXBY
2,890,772
TRANSMISSION
Filed Nov. 30, 1956
6 Sheets-Sheet 3
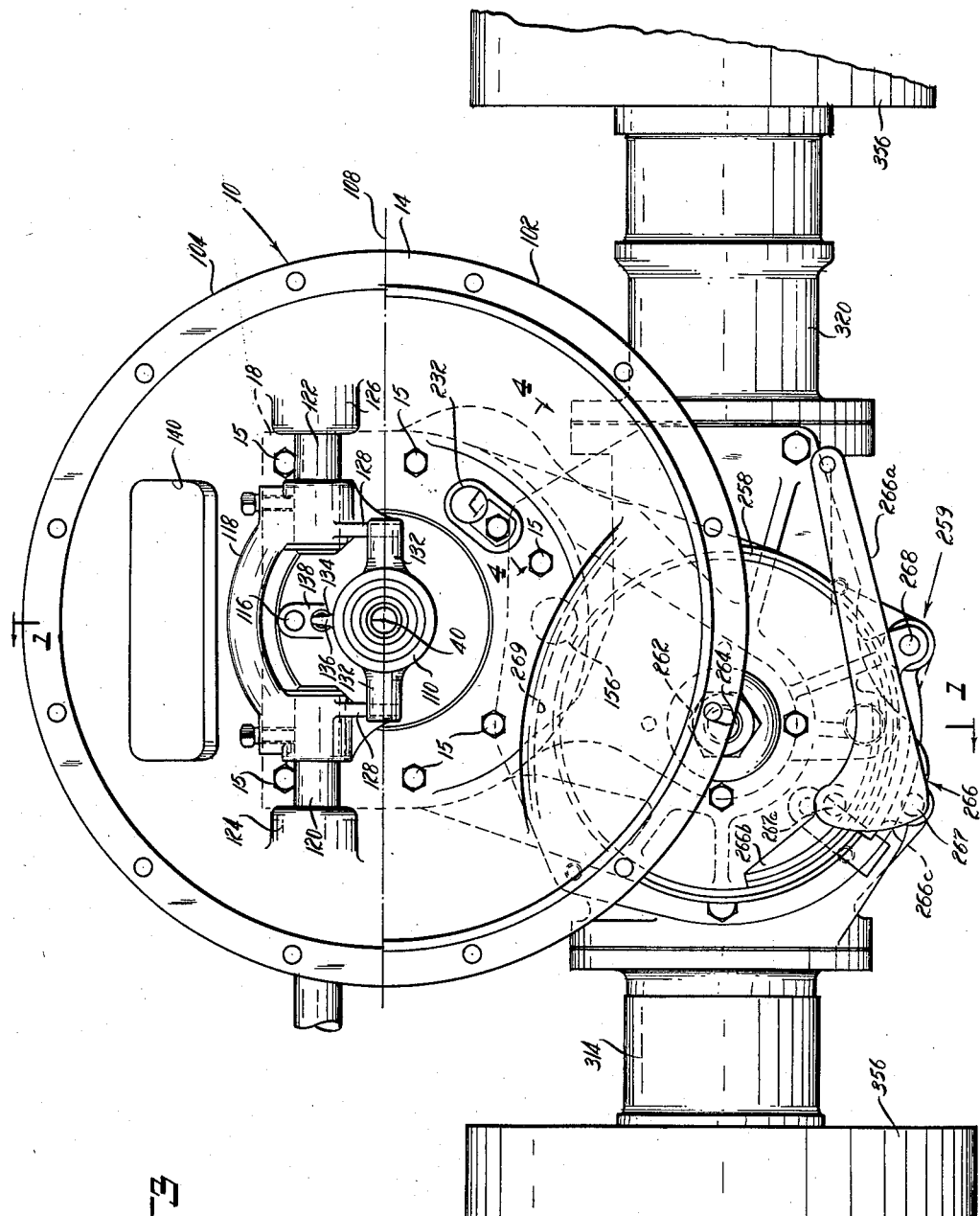
INVENTOR
LEO A. BIXBY
BY
ATTORNEYS

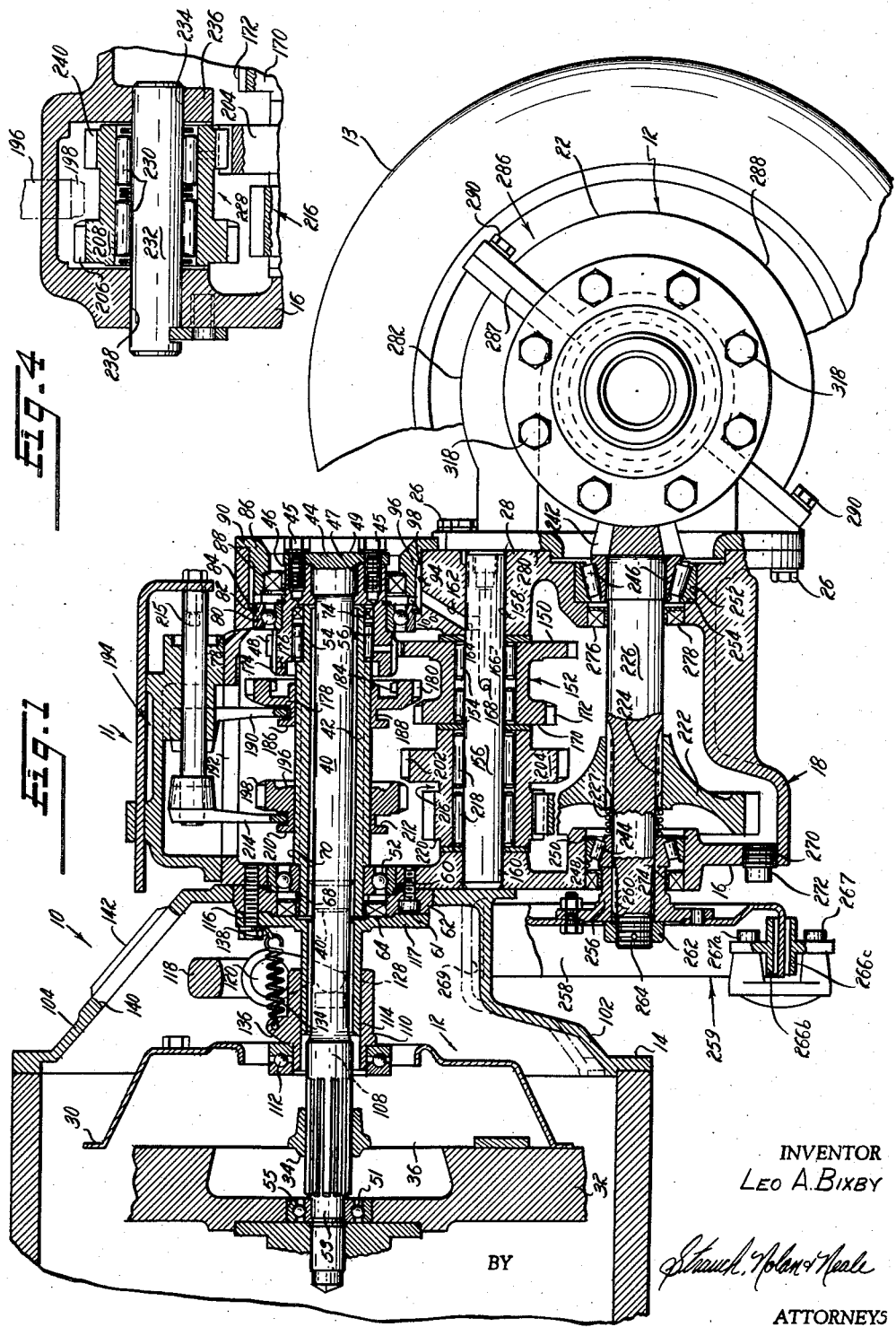

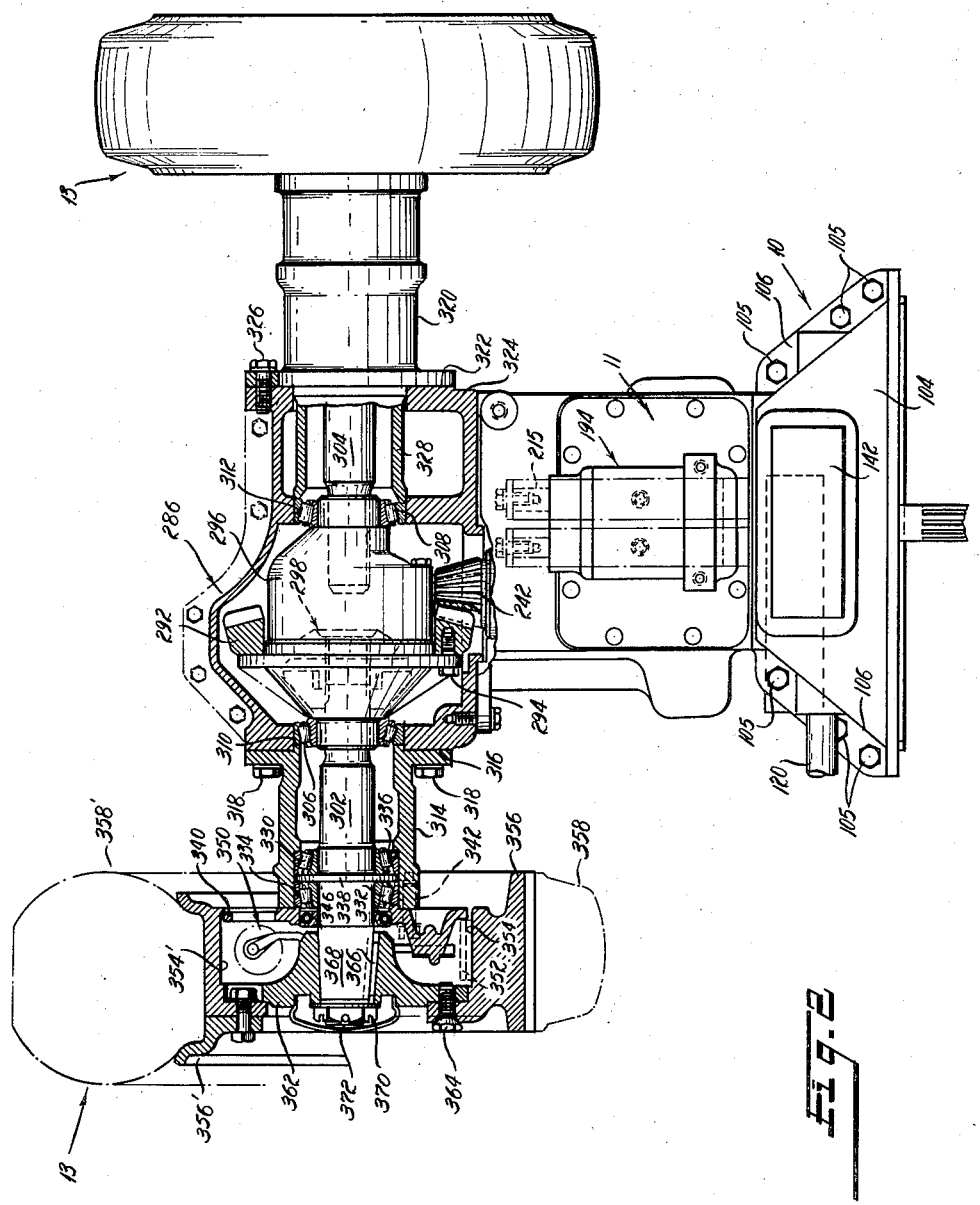

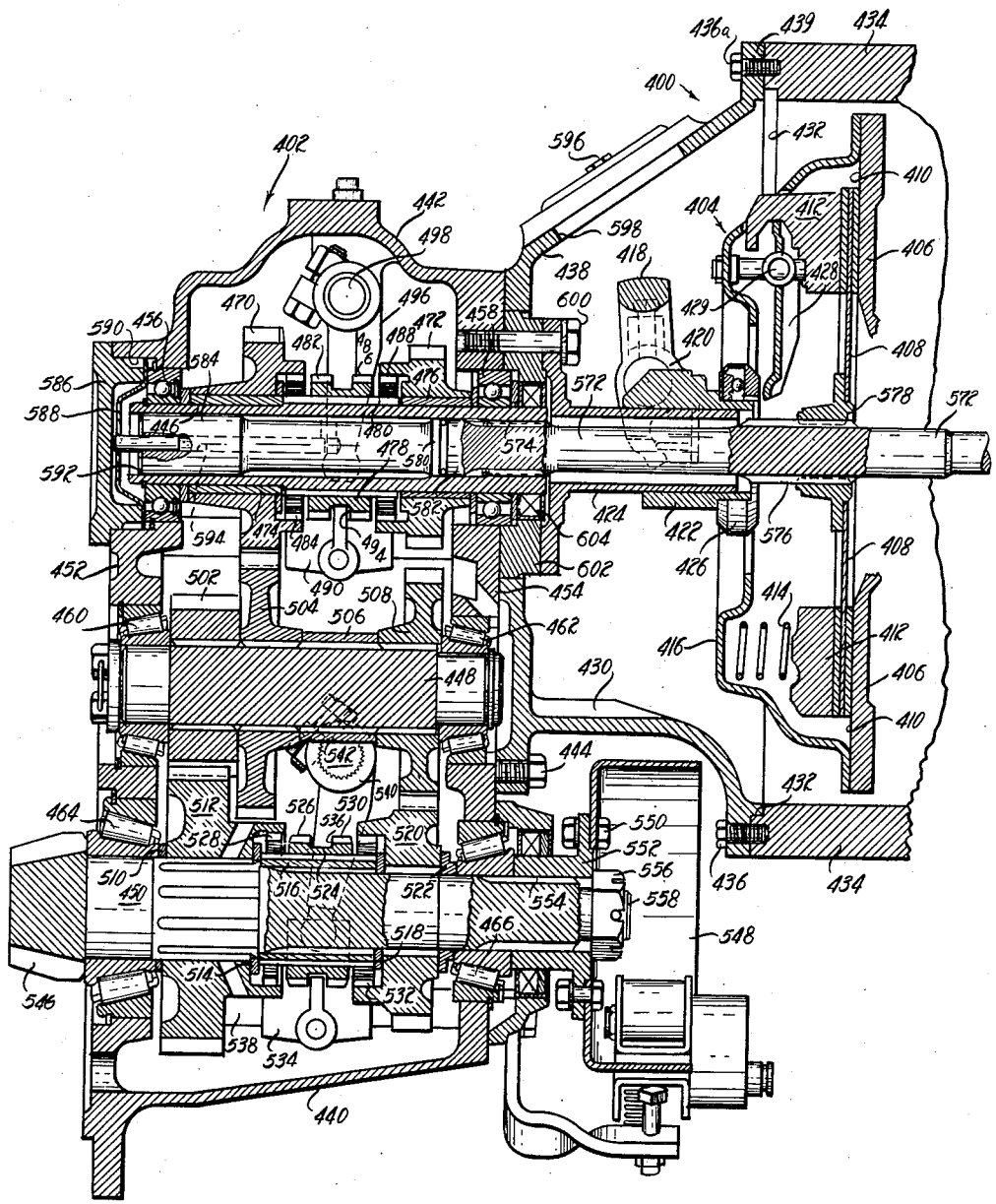

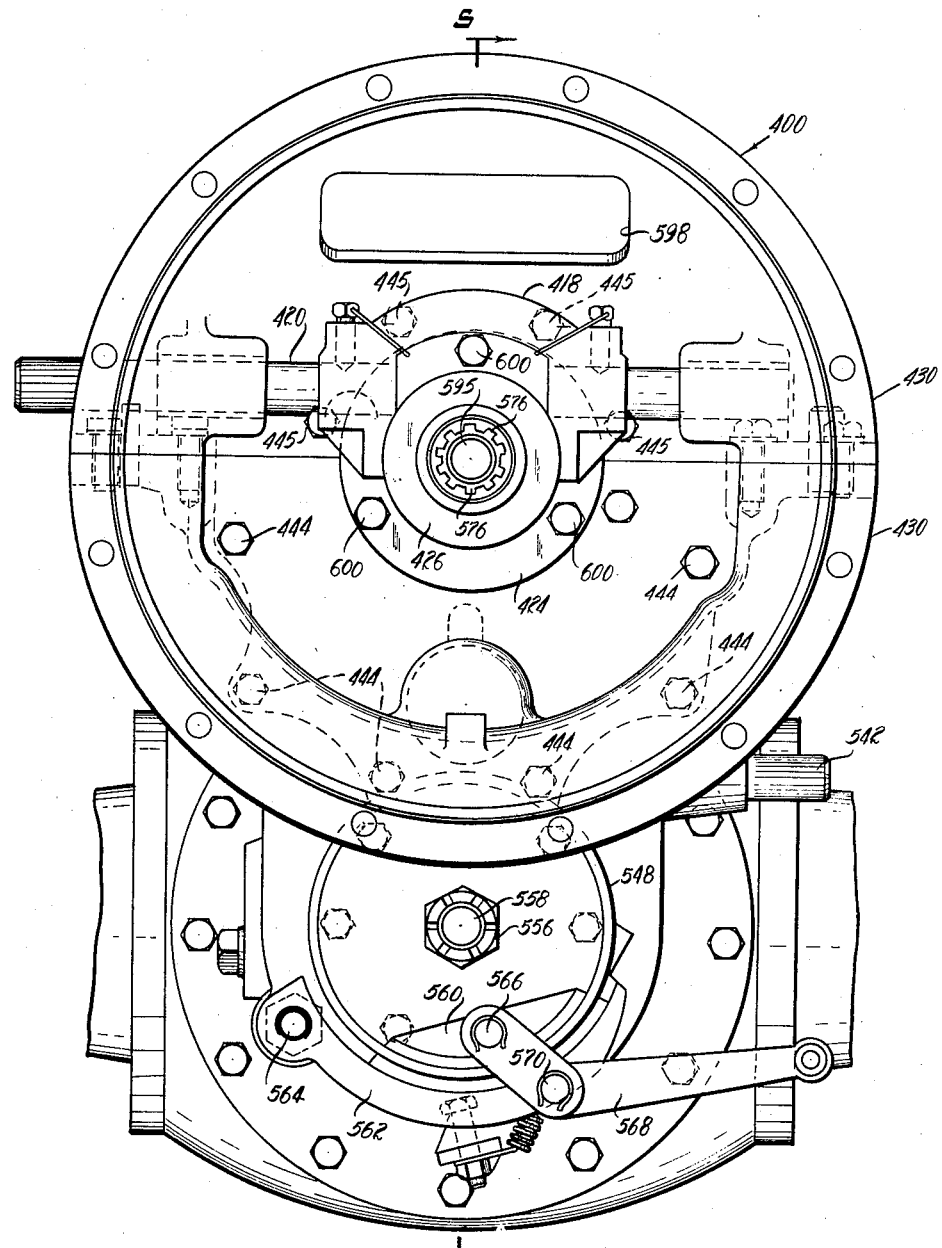

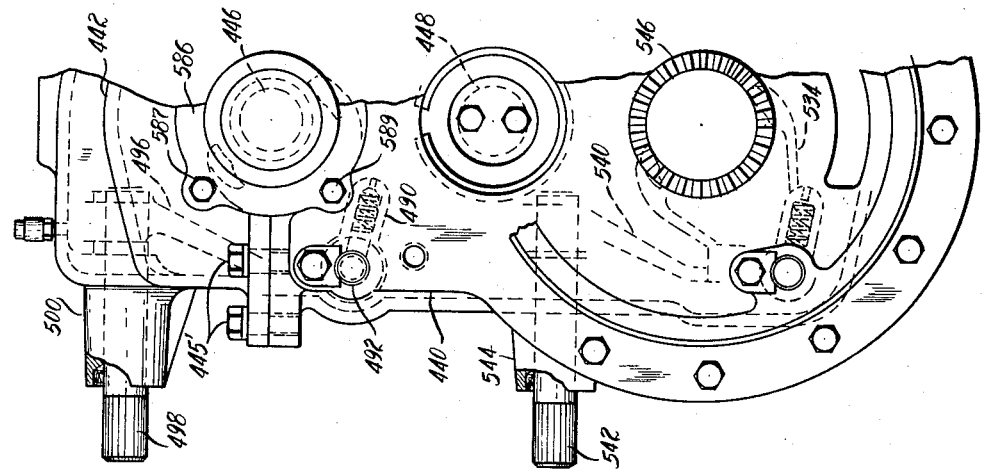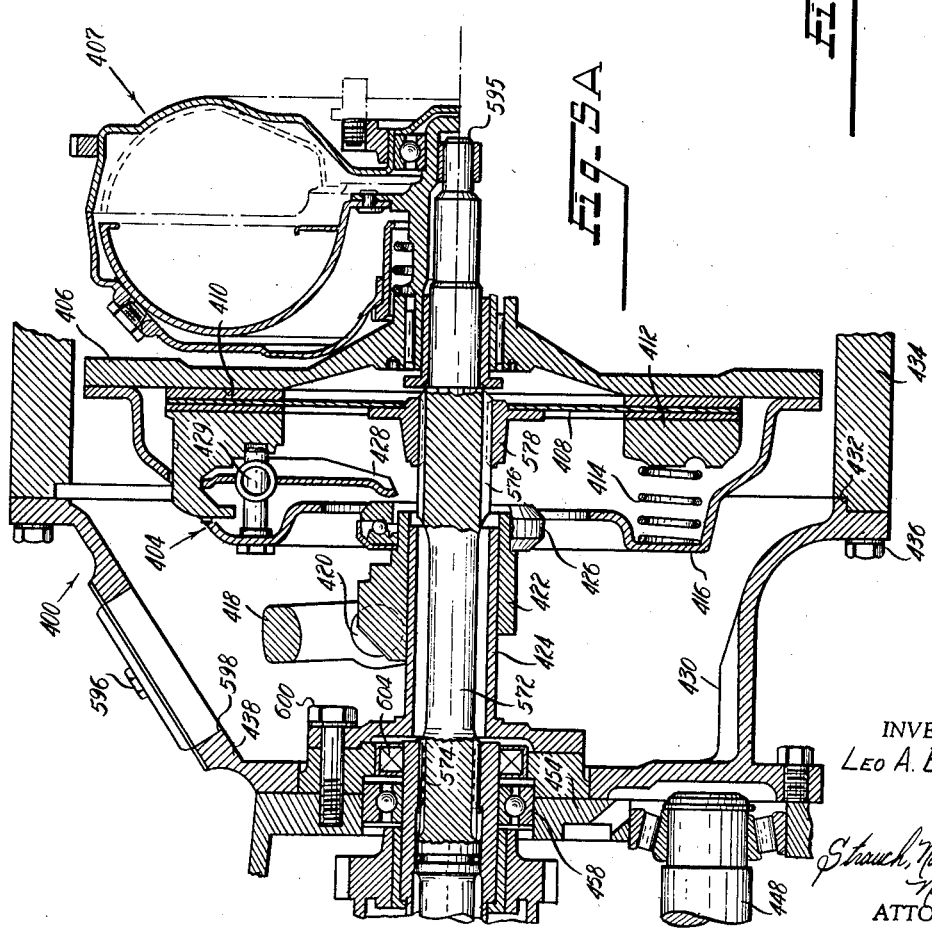

United States Patent Office 2,890,772
Patented June 16, 1959

2,890,772

TRANSMISSION

Leo A. Bixby, Niles, Mich., assignor to Rockwell-Standard Corporation, a corporation of Pennsylvania Application November 30, 1956, Serial No. 625,404

9 Claims. (Cl. 192—3.5)

This invention relates to improvements in vehicle drive trains and is particularly directed to transmission improvements facilitating clutch replacement in transmissions for shop trucks.

In most commercial closely coupled power drives for vehicles having a disc type friction clutch between the engine and the transmission, it has been necessary prior to the present invention to replace clutch elements by removing the engine or transmission or opening and perhaps partially tearing down the transmission. In power drives in which the transmission has to be opened up and partially torn down, in order to change the clutch, transmission oil may have to be drained and/or dirt and foreign material may get into the transmission oil and bearings.

In addition, with an open transmission during a clutch change, transmission oil may contaminate clutch parts. Of the prior art transmissions heretofore developed, that disclosed in copending application Serial No. 228,178, filed May 25, 1951, now Patent No. 2,805,743, dated September 10, 1957, for Vehicle Drive Mechanism by B. W. Keese is the most satisfactory.

The primary object of this invention is, therefore, to provide a new improved vehicle drive train embodying an engine driven clutch and a change speed and reverse drive transmission closely coupled thereto in which the clutch may be replaced without disturbing the components of the transmission.

Another object of the present invention is to provide a shop truck transmission embodying a tubular main shaft, a clutch connected shaft extending therethrough, and means so connecting such shafts that such shafts can be disconnected and said clutch connected shaft disconnected from such clutch without disassembly of the transmission.

A further object is to provide a shop truck transmission in which a clutch connected shaft is connected to the transmission input drive gear at the opposite end of the transmission from the drive train clutch.

A further object is to provide an improved engine driven clutch connected shop truck transmission in which clutch replacement can be effected without oil contamination of clutch parts and without draining the transmission oil.

A further object is to provide a close coupled shop truck drive train embodying a 2 speed forward and 2 speed reverse transmission having a final constant gear reduction which is the first reduction of the axle combination.

Another object is to provide a close coupled shop truck drive train embodying a change speed and reverse drive, main transmission having a reduction ratio between its input and output such that the need for axle outer end reductions or a double reduction within the differential and bevel gear box itself is eliminated.

A further object is to provide a shop truck transmission in which the final reduction in the transmission may be readily varied to provide optional vehicle speed ratios.

A further object is to provide a shop truck drive train embodying a transmission and drive axle unit which can be parted at the axle and for the axle to be readily adaptable for use with other drive arrangements such as an electric motor with a suitable reduction box.

Further objects of the present invention will become apparent from the following description, when considered in connection with the accompanying drawings and the appended claims.

In the drawings which illustrate two simple and practical embodiments of the invention:

Figure 1 is a partially cut away and sectioned side view of my new improved clutch, transmission and axle vehicle power drive;

Figure 2 is a partially cut away and sectioned plan view of the vehicle power drive of Figure 1 showing clutch and transmission housing detail and differential and axle assembly detail;

Figure 3 is a rear view of the clutch, transmission and axle drive assembly;

Figure 4 is a fragmentary sectional view along the line 4—4 of Figure 3 showing reverse idler gear detail for the transmission shown in Figure 1;

Figure 5 is a vertical sectional view through a transmission constituting a second embodiment of the invention, the section being taken along the line 5—5 of Figure 6;

Figure 5A is a fragmentary sectional view constituting an extension of Figure 5 and illustrating the power input connective to the transmission of Figure 5;

Figure 6 is a rear end view of the transmission of Figure 5 with the clutch input removed; and Figure 7 is a fragmentary front elevational view of the transmission of Figure 5.

With reference to the drawings, particularly Figures 1 and 2, the drive train of the preferred embodiment of the present invention comprises an engine driven clutch assembly 10, a change speed and reverse drive transmission 11, and a drive axle assembly 12 supported at its outer ends on ground engaging wheels 13. The two part housing 14 of clutch assembly 10 is fixed by bolts 15 (Figure 3) to the upper portion of the rear wall 16 of the transmission housing 18. The two part housing 22 of axle assembly 12 is fixed by bolts 26 to the lower portion of the front wall 28 of transmission housing 18.

*Clutch and clutch output transmission input*

The input portions and clutch cover 30 of conventional disc type friction clutch assembly 10 are fastened to engine driven flywheel 32 by conventional means (not shown). The hub 34 of clutch output member 36 is splined to clutch output shaft 40. Clutch output shaft 40 extends forwardly through the bore of the tubular main transmission shaft 42 to the front of transmission 11. Flange 44, integral with shaft 40, is fastened by bolts 45 to and stabilizes the forwardly extended hub 46 of transmission input gear 48. Shaft 40 is supported at its forward end by the piloting of enlarged diameter shaft portion 47 in bore 49 of hub 46 and is journalled at its rear end by a bearing 51 which is received on rear end reduced diameter shaft portion 53 and which is supported in opening 55 of flywheel 32.

Tubular main shaft 42 is journalled in transmission housing 18 in surrounding relation to shaft 40 by ball type anti-friction bearing 52 in rear wall 16 and by roller type anti-friction bearing 54 in end bore 56 of transmission input gear 48. Ball bearing 52 is axially fixed relative to rear wall 16 by a snap ring 60 and by a retaining member 62 for an oil seal 64. Retaining member 62 is fastened to wall 16 by countersunk socket head screws 61. The inner race of ball bearing 52 is axially fixed on shaft 42 between snap ring 68 and the end of external splines 70. Oil seal 64 engages shaft 42 to the left (as viewed in Figure 1) of snap ring 68 to prevent loss of lubricant from housing 18 along shaft 42. Roller bearing 54 surrounds shaft 42 between the opposite end of splines 70 and an oil seal 74 within bore 56. Oil seal 74 is restrained from rightward movement by the end wall of bore 56.

Transmission input gear 48 is journalled by ball type anti-friction bearing 78, the outer race of which is axially restrained in opening 80 of housing 18 by snap ring 82 and by end 84 or the retainer 86 for oil seal 88. Retainer 86 is formed with flange 90 which is fastened by conventional means (not shown) to wall 28 of transmission housing 18. Retainer 86 is piloted in opening 94 of housing wall 28. A reduced diameter portion 96 thereof defines with opening 94 an annular oil space 98. Radial slots 100 in retainer 86 provide for oil flow to annular oil space 98.

Referring to Figures 1 and 3, clutch housing assembly 10 is a two part housing having a bottom member 102 and a top member 104 which are fastened together by bolts 105 (Figure 2) through flanges 106 of the housing members 102 and 104, the two parts 102 and 104 being separable along the housing horizontal parting line 108 (Figures 1 and 3).

Referring to Figure 1, the tubular carrier 110 for clutch throwout thrust bearing 112 is axially shiftably mounted on tubular carrier support member 114. Member 114 is fixed to member 62 and transmission wall 16 by spaced bolts 116 which extend through radial flange 117 of support member 114 and retaining member 62 into aligned threaded openings in wall 16. Clutch shifter fork 118 (Figure 3) is non-rotatably secured to actuating rod 120 at one side and to support rod 122 at the other side. Actuating rod 120 is rotatably journalled in boss 124 of clutch housing top member 104, projecting through to the exterior of clutch housing assembly 10, and support rod 122 is rotatably journalled in boss 126 of clutch housing top member 104.

Depending arms 128 of clutch shifter fork 118 engage pads of pad projections 132 which are integral with and project from the opposite sides of clutch throwout bearing carrier 110. Clutch shifter fork 118, when actuated by clockwise rotation of rod 120 as viewed in Figure 1, is effective to shift carrier 110 and the clutch throwout bearing 112 axially to the left to disengage the clutch in the conventional manner. Carrier 110 and clutch throwout bearing 112 are resiliently biased to the right by return spring 134 which is fastened between carrier top projection 136 at one end and anchor tab 138 at the other end. Anchor tab 138 is held in place on flange 117 of support member 114 by the head of bolt 116. Return spring 134 is effective to shift carrier 110 and the clutch throwout bearing 112 to the right to prevent clutch disengagement when pressure between arms 128 and carrier pads 130 are relaxed.

*Clutch replacement*

In order to remove the clutch assembly 12 for replacement or maintenance purposes, bolts 45 are removed to disconnect flange 44 from the hub of gear 48 and clutch output shaft 40 is moved axially forward to the right through transmission 11 to the position 40' partially shown by phantom lines in Figure 1. Top member 104 of clutch housing assembly 10 must be removed for clutch replacement. Top member 104 is provided with an access opening 140 through which bolts 15 (Figure 3) which fasten top member 104 to transmission wall 16 are removed after opening cover 142 has been removed. The bolts 105 (Figure 2) through flanges 106 of top member 104 and bottom member 102 are then removed and clutch housing top member 104 together with clutch fork 118 actuating rod 120 and fork support rod 122 mounted thereon are lifted away as a unitary sub-assembly. Bolts 116 (Figure 1) are then removed to free support member 114 from member 62 and transmission wall 16. Carrier 110 is then moved on support member 114 toward flange 117 in order that clutch throwout thrust bearing 112 will clear clutch cover 30. Support member 114, carrier 110, bearing 112 and return spring 134 are then removed as a unit. Clutch output shaft 40 does not interfere when withdrawn to the position 40' because rear end shaft portion 53 is to the right of flange 117 of support member 114. Screws (not shown) mounting clutch cover 30 to flywheel 32 are then removed and the rest of clutch assembly 12 tilted forward (to the right) at the top and removed. Replacing the clutch assembly 12 after removal requires the reverse of the above steps in reverse sequence.

The above outlined method of clutch replacement does not disturb transmission oil seals 64, 74 and 88 and the transmission 11 is not opened in any way for clutch replacement. Transmission oil does not have to be drained and there is no danger of getting dirt and foreign material into the transmission oil and bearings when the clutch is removed and replaced. With the above described construction and method for replacing a clutch, oil contamination of clutch parts is practically impossible.

*Transmission unit*

Gear 150 of gear cluster 152, which is rotatably supported by roller bearings 154 on fixed intermediate shaft 156, is in constant mesh with transmission input gear 48. Fixed intermediate shaft 156 is supported at one end in opening 158 of transmission wall 28 and at the other end in opening 160 of transmission wall 16. Oil opening 162 in wall 28 permits oil flow from space 98 through openings 164, 166 and 168 in counter shaft 156 to roller bearings 154. The other gear 170 of gear cluster 152 has bevel ended gear teeth 172 for a purpose which will become apparent presently.

Transmission input gear 48 is formed with bevel ended clutch splines 174 on extension 176. Gear clutch member 178 is splined for axial shifting movement along external splines 70 of transmission main shaft 42. Gear member 178 is axially shiftable from the neutral position shown to a position in meshing engagement between bevel ended gear teeth 180 thereon with teeth 172 of gear 170 for low speed transmission drive between gear 48 and shaft 42. Rightward movement of gear 178 engages bevel ended clutch splines 184 of gear member 178 with clutch splines 174 to establish direct drive between gear 48 and shaft 42 for high speed transmission drive. Hub 186 of gear member 178 is formed with annular groove 188 which is engaged by shift fork 190. Shift fork 190 extends through opening 192 in the top of transmission housing 18 and is fixed upon a longitudinally displaceable shift rail of shift mechanism assembly 194 which is mounted on the top of housing 18.

Gear member 196 is axially shiftably non-rotatably mounted on splines 70 of transmission main shaft 42. Gear teeth 198 of member 196 are bevel ended at each end for shifting from the neutral position shown to meshing engagement with bevel ended gear teeth 202 of the gear 204 journalled on intermediate shaft 156 for forward drive or to meshing engagement with bevel ended gear teeth 206 of reverse gear 208 (Figure 4) for reverse drive. Hub 210 (Figure 1) of gear member 196 is formed with annular groove 212 which is engaged by shift fork 214. Shift fork 214 extends through transmission housing top opening 192 and is mounted on shift rail 215 of shift mechanism assembly 194 for controlled longitudinal displacement therewith.

Gear 204 is part of gear cluster 216 which is rotatably supported by roller bearings 218 on fixed intermediate shaft 156. The other gear 220 of gear cluster 216 is in constant mesh with output gear 222. Gear 222 is axially wedged on splines 224 of transmission output shaft 226 by a coil spring 227 which is compressed between the inner race of bearing 244 and gear 222.

Gear 208 (Figure 4) is part of reverse idler gear cluster 228 which is rotatably supported by roller bearings 230 on fixed reverse idler shaft 232. Reverse idler shaft 232 is supported at one end in opening 234 of internal housing boss 236 and at the other end in opening 238 of housing wall 16. The other gear 240 of reverse idler gear cluster 228 is in constant mesh with gear 204 of gear cluster 216.

Transmission output shaft 226 on the end of which is integrally formed a bevel pinion gear 242, is rotatably supported by opposed tapered roller thrust bearings 244 and 246 mounted respectively in transmission housing walls 16 and 28. The outer race of bearing 244 is axially restrained in opening 248 of wall 16 by internal snap ring 250. The outer race of bearing 246 is axially restrained in opening 252 of wall 28 by radial shoulder 254. Hub 256 of brake drum 258 for brake assembly 259, which is preferably of the opposed inner and outer dual shoe type, is splined at 260 to the rear end of transmission output shaft 226 and axially restrained thereon between the inner race of bearing 244 and a nut 262 threaded on the reduced diameter threaded end portion 264 of shaft 226. The degree of tightness of nut 262 controls the preloading of bearings 244 and 246. Referring to Figure 3, an opposed dual shoe brake shoe assembly 266, pivotally anchored on pivot stud 268 to housing 18, and comprising an actuating lever 266a, pivoted on stud 267, an internal brake shoe 266b pivoted on lever 266a at 267a and an external brake shoe 266c pivoted on lever 266a at 267, is provided for engaging brake drum 258. Clutch assembly 12 and brake assembly 259 are both located outside and rearwardly of the transmission housing wall 16, with brake assembly 259 below clutch assembly 12. The lower clutch housing casting 102 is suitably formed as shown at 269 to provide clearance for the upper portion of drum 258.

Taper threaded oil drain opening 270 and plug 272 are provided at the bottom of transmission housing 18. Oil seal 274 is mounted in surrounding relation to brake drum hub 256 within opening 248 and oil seal 276 is mounted in surrounding relation to shaft 226 within opening 278 of wall 28 to limit loss of oil from transmission 11.

The reduction through meshing gears 220 and 222 effects part of the drive reduction normally found in an axle to the transmission 11. This results in reduction of the overall diameter of the differential case and dimensions of axle assembly 24. Gear 222 and gear cluster 216 may be radially changed to provide optional reduction ratios through gears 220 and 222. In the specific disclosed embodiment gear 48 has 24 teeth; gear 150, 35 teeth; gear 170, 26 teeth; gear 178, 33 teeth; gear 196, 28 teeth; gear 208, 21 teeth; gear 240, 18 teeth; gear 204, 31 teeth; gear 220, 19 teeth; and gear 222, 41 teeth.

Transmission 11 may be taken from face 280 of axle 24 when bolts 26 have been removed and the axle 24 may be used with an electric motor and gear reduction box drive (not shown) mounted to axle face 280 by bolts 26.

The axle

Referring to Figure 1, axle mounting face 280 is on the rear half 282 on a diagonally split axle bowl housing assembly 286 separable along a parting plane 287. Housing half 288 of housing assembly 286 is fastened to housing half 282 by spaced bolts 290. Referring to Figure 2, bevel pinion gear 242 is in constant mesh with and drives a differential bevel ring gear 292 which is mounted by spaced bolts 294 to the differential case 296 enclosing a bevel gear differential 298 of conventional construction. The differential case assembly 296, into the opposite ends of which co-axially project axle shafts 302 and 304 for splined driving engagement with the side gears of differential 298, is journalled in housing 286 by opposed tapered roller thrust bearings 306 and 308 mounted in housing openings 310 and 312 respectively. A hollow axle shaft housing 314 is fastened to face 316 of axle bowl housing assembly 286 by bolts 318 and is formed with an integral annular boss piloted in opening 310 and in abutment with the outer race of bearing 306 to restrain bearing 306 axially in position in opening 310. Axle shaft housing 320 for shaft 304, which is of a greater length than axle shaft housing 314, is fastened to axle bowl housing assembly face 322 at the end of housing extension 324 by bolts 326. Tubular extension 328 of axle shaft housing 320 is piloted in opening 312 in abutment with the outer race of bearing 308 to restrain bearing 308 axially in position in opening 312.

Axle shaft 302 is journalled in housing 314 at the outer end thereof by opposed tapered roller thrust bearings 330 and 332 which are received in opening 334 of axle shaft housing 314. Bearings 330 and 332 are restrained axially in place within opening 334 by housing shoulder 336, radially extending flange 338 on shaft 302 and by an annular boss on brake backing plate 340 piloted in opening 330. Brake backing plate 340, which is mounted on the end of axle shaft housing 314 by stud and nut assemblies 342, supports an oil seal 346 in surrounding sealed relation to shaft 302 outwardly of bearing 330 to limit loss of oil from the axle and to prevent oil contamination of the internally expansible brake assembly 350. Brake assembly 350, which is mounted on backing plate 340, includes opposed pivotally mounted brake shoes 352 which, when actuated, engage drum surface 354 of mounting rim 356 for solid tire 358 and on surface 354' of split rim 356' when pneumatic tire 358' is used. Wheel rim and drum member 356 is mounted to wheel hub 362 by spaced bolts 364. Wheel hub 362 is fixed for rotation by a key 366 to the tapered shank 368 of axle shaft 302 and is wedged axially in place thereon by nut 370 threaded on axle shaft threaded end portion 372. The outer end support and wheel mounting for shaft 304 is, in all respects, identical with that illustrated and described to shaft 302.

From the foregoing it is apparent that this embodiment of the invention provides a new improved close coupled vehicle drive train with an easily replaceable disc type friction clutch that may be replaced without opening or disturbing the main change speed and reverse drive transmission. It provides a transmission with a tubular main shaft through which extends the clutch output shaft which is fastened to the transmission input gear on the opposite end of the transmission from the clutch. It provides means for clutch replacement without oil contamination of clutch parts and without having to drain transmission oil. It provides a transmission with two speeds forward and two speeds in reverse and with a final gear reduction which is the first reduction of the axle and transmission combination, and with the differential reduction eliminates the necessity of drive axle outer end gear reduction heretofore required in shop trucks and similar industrial vehicles.

A further embodiment of the present invention in which the principles of the present invention are applied to the close coupled shop truck transmission is illustrated in Figures 5, 6 and 7.

Referring to Figure 5, the drive train therein illustrated comprises a disc or plate type friction clutch unit 400 and a change speed and reverse drive transmission unit 402.

The clutch unit 400 comprises a generally conventional plate type friction clutch 404 mounted upon the output flywheel 406 of an engine driven torque converter 407 (Figure 5A). Clutch 404 includes a clutch disc 408 resiliently pressed against the clutch face 410 of the flywheel 406 by an annular pressure plate 412 which is resiliently biased to the right as viewed in Figures 5 and 5A by equiangularly spaced compressed coil springs 414 which are maintained in their compressed condition by the clutch cover 416 which is affixed at its periphery to the flywheel 406 by spaced bolts (not shown). The clutch 404 is released by pivotal movement of the clutch release fork 418 in a counterclockwise direction about the pivot studs 420 upon which it is pivotally mounted to shift the clutch release bearing sleeve 422 axially to the right as viewed in Figures 5 and 5A along its tubular support 424 to force the clutch release bearing 426 into engagement with the clutch release levers 428 which are pivotally mounted at 429 upon the clutch cover 416. Pivotal movement of levers 428 is effective, in the conventional manner, to relieve the pressure of pressure plate 412 upon the clutch disc 408.

The clutch 404 is disposed within a two part separable housing having a lower part 430 which is piloted within a counterbore 432 in the end of the flywheel housing 434 and fixed thereto by suitably spaced bolts 436 and an upper part 438 which is externally bolted to clutch housing part 430 and to the end face 439 of the flywheel housing 434 by spaced bolts 436A. The parting plane between clutch parts 438 and 430 includes the axis of rotation of the flywheel 406 and the clutch 404 and is preferably a horizontal plane through the axis in the normal orientation of the assembly. As will be pointed out in greater detail, the clutch housing part 438 is readily separable and removable to permit access to the clutch 404 to facilitate its maintenance or removal from the unit.

The transmission unit 402 is housed within a two part housing consisting of lower part 440 and upper part 442. Transmission housing part 440 is fixed to clutch housing part 438 by spaced bolts 444 and transmission housing part 442 is fixed to clutch housing part 438 by suitably spaced bolts 445 (Figure 6) manipulatable from within the clutch housing part 438 to effect separation thereof. The parting plane between the transmission housing parts 440 and 442 is coplanar with the parting plane between the clutch housing parts 430 and 438 and these two housing parts 440 and 442 are connected together by bolts 445′ (Figure 7).

The transmission unit is provided with a tubular main shaft 446, an intermediate shaft 448 and an output shaft 450 which are journalled respectively for rotation about spaced parallel axes upon the front wall 452 and the rear wall 454 by ball type antifriction bearings 456 and 458, opposed tapered roller bearing type antifriction bearings 460 and 462, and opposed tapered roller bearing type antifriction bearings 464 and 466. A fixed countershaft (not shown) is mounted upon housing part 440 in spaced parallel relation to and between main shaft 446 and intermediate shaft 448.

A pair of gears 470 and 472 are journalled in axially fixed relation upon the input shaft 446 adjacent the opposite ends thereof by bearings 474 and 476 respectively, and a clutch collar 478 is mounted for axial displacement along the central splined portion 480 of shaft 446, being fixed for rotation with the shaft 446 by splined engagement with the splines 480. Clutch collar 478 may be shifted to the left as viewed in Figure 5 from its neutral position, as illustrated, to a position in which its annular row of external clutch teeth 482 is in toothed engagement with the internal annular row of clutch teeth 484 on gear 470 to connect shaft 446 and gear 470 for unitary rotation, or to the right as viewed in Figure 5 to a position in which the annular row of external clutch teeth 486 is in toothed engagement with the internal annular row of clutch teeth 488 on gear 472 to establish positive driving engagement between the shaft 446 and the gear 472.

The axial displacement of clutch collar 478 is controlled by a shifter fork 490 that is mounted for movement upon a shift rail 492 (Figure 7) and the arms of which engage the central annular groove 494 of clutch collar 478 (Figure 5). The displacement of shifter fork 490 is controlled by a lever 496 which is fixed to a pivot shaft 498 mounted for pivotal movement in an exteriorly projecting boss 500 (Figure 7) on housing part 442.

Referring again to Figure 5, mounted on the intermediate shaft 448 between the inner races of the bearings 460 and 462 in axially fixed relation on shaft 448 are a gear 502, a gear 504, an annular spacer 506 and a gear 508. Gear 504 is in constant mesh with the gear 470. Gear 508 is in constant mesh with a reverse idler gear (not shown) journalled on the countershaft previously referred to, which reverse gear is also in constant mesh with the gear 472 of the input shaft 446. Since both gears 504 and 508 are splined to the intermediate shaft 448, drive connection of gear 470 to input shaft 446 through clutch collar 478 will impart rotation to intermediate shaft 448 in one direction and drive connection of the gear 472 to the input shaft 446 through the clutch collar 478 will impart drive rotation to the intermediate shaft 448 in the opposite direction.

Mounted on the output shaft 450 between the inner race of bearing 464 and the inner race of bearing 466 are a spacer 510, a gear 512, which is journalled on the shaft 450, a spacer 514, an externally and internally splined sleeve 516 which is splined to the shaft 450, a spacer 518, a gear 520 which is journalled on the shaft 450 and a spacer 522. Gear 512, which is rotatably mounted upon the shaft 450, is in constant mesh with the gear 502 fixed for rotation with the intermediate shaft 448 and gear 520 which is journalled on the output shaft 450 is in constant mesh with the gear 508 fixed for rotation with the intermediate shaft 448. Gears 512 and 520 are selectively connected in drive relation to the output shaft 450 through a clutch collar 524 which is splined to the externally splined sleeve 516 and axially movable therealong, from the neutral position shown, to the left as viewed in Figure 5 into positive driving engagement with the gear 512 in which the external annular row of clutch teeth 526 on clutch collar 524 is in toothed engagement with the internal annular row of clutch teeth 528 on the gear 512 or to the right as viewed in Figure 5 into positive driving engagement with the gear 520 in a position in which the external annular row of clutch teeth 530 on clutch collar 524 is in toothed engagement with the internal annular row of clutch teeth 532 on the gear 520.

The movement of clutch collar 524 is controlled through a shifter fork 534, the arms of which engage a central external annular groove 536 on the clutch collar 524 and which is fixed to a shift rail 538 mounted in the transmission housing lower part 440 and controlled by a shift lever 540 fixed to a pivot shaft 542 which, as is most clearly shown in Figure 7, projects through and is pivotally mounted in a boss 544 formed integrally with the transmission housing lower part 440.

The coupling of output shaft 450 and gear 520 through clutch collar 524 establishes a high speed drive to the output shaft 450 for either forward or reverse and the coupling of gear 512 to the output shaft 450 through the clutch collar 524 establishes a low speed drive to the output shaft 450 for either forward or reverse.

A differential drive pinion 546 is formed integrally with the shaft 450 exteriorly of the bearing 464. Drive pinion 546, in assembly, is in constant mesh with the ring gear of a conventional drive axle differential (not shown). A brake drum 548 fixed by bolts 550 to a hub 552 is fixed through mating splines 554 to the output shaft 450 exteriorly of the bearing 466 and is held in position thereon by a nut 556 threaded on the reduced diameter, threaded end portion 558 of shaft 450. As is most clearly illustrated in Figure 6, brake drum 548 is engaged internally and externally by interconnected opposed brake shoes 560 and 562. Brake shoe 562 is pivotally mounted upon the transmission housing lower half 440 upon a pivot stud 564 and shoe 560 is pivotally mounted upon a stud 566 carried by the brake actuating lever 568 which is pivoted upon stud 570 to the shoe 562.

Referring to Figure 5, the clutch disc 408 is drive connected to the transmission input shaft 446 by a shaft 572 which extends through the tubular transmission input shaft 446, is provided with axially extending splines 574 by which it is connected to transmission input shaft 446 for unitary rotation, extends freely through the bore of the tubular support 424 and is provided with external axially extending splines 576 by which it is spline connected to the central hub 578 of the clutch disc 408 for unitary rotation therewith. Shaft 572 is supported in coaxial relation to the shaft 446 by annular piloting surfaces 580, 582 and 584 which are received with a free sliding fit within the bore of the shaft 446.

The shaft 572 may be disengaged from the clutch disc 408 and moved axially to the left as viewed in Figures 5 and 5A sufficient to permit disassembly and removal of the clutch 404 by removal of the bearing retainer cap 586 which is bolted to the housing halves 440 and 442 by bolts 587, removal of the oil baffle 588 which is retained within the recess 590 in which retainer 586 is received, and the removal of the snap ring retainer 592 which in assembly is received in an annular groove within the bore of the shaft 446 at the left end of shaft 572, and which prevents leftward axial movement of the shaft 572 within the bore of the transmission input shaft 446 during operation. After removal of these parts, a threaded tool may be inserted into the threaded end portion of the axially extending oil distributing bore 594 and the shaft 572 pulled through the tubular shaft 446 to the left sufficiently so that the opposite end 595 (Figure 5A) of the shaft 572 is in substantial alignment with the inner face of the vertical wall of clutch housing part 430. The splines 576 are identical with splines 574 to permit this axial movement of shaft 572.

The clutch housing part 438 may be disconnected from the flywheel housing 434 and the clutch housing lower part 430 by removal of the external bolts interconnecting it thereto and by removing the cover 596 for the access opening 598 in the clutch housing part 438 to permit removal of the bolts (not shown) by which clutch housing part 438 is interconnected to the transmission housing upper part 442. Removal of these bolts will permit the lifting of the clutch housing part 438 from the lower clutch housing part 430 to expose the clutch 440, the shifter 418 being removed with the clutch housing part 438. After removal of the clutch housing part 438, the bolts 600 by which the tubular support 424 is fixed to the retainer 602 for the oil seal 604 and to the wall 454 of the transmission housing upper and lower parts 440 and 442, can be removed and the tubular support 424 together with the clutch release bearing 426 and clutch release bearing sleeve 424 may be removed as a subassembly. After removal of these parts the clutch 404 may be disassembled, removed and replaced quite easily.

It will be noted that this structure permits removal and disassembly of the clutch 404 without disturbing any of the bearings or shaft mountings of the transmission unit 402. It will be further noted that this is effected without disturbing the oil seal 604 which prevents leakage of oil from the transmission housing along the exterior of the tubular shaft 446 so that the transmission need not be drained, and is protected from contaminating dust during clutch servicing and so that the clutch parts are fully protected from contamination by oil during such servicing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is to be claimed and desired to be secured by United States Letters Patent is:

1. In a vehicle drive train, an engine driven flywheel, a clutch and a transmission assembled and connected together seriatim in close coupled relation, a housing for said transmission, a clutch housing assembly connected to said transmission housing and having a removable cover, a tubular main shaft in said transmission, a clutch output shaft drive connected to the output of said clutch and projecting through said tubular main shaft, and separable means for drive connecting said clutch output shaft and said tubular shaft for unitary rotation, said transmission embodying serially arranged change speed and reverse drive gearing providing a plurality of forward and a plurality of reverse drive ratios.

2. In a vehicle drive train, an engine driven flywheel, a clutch and a transmission assembled and connected together seriatim in close coupled relation, a housing for said transmission, a clutch housing assembly connected to said transmission housing and having a removable cover, a tubular main shaft in said transmission, a clutch output shaft drive connected to the output of said clutch and projecting through said tubular main shaft, and separable means for drive connecting said clutch output shaft and said tubular shaft for unitary rotation, said transmission including an input gear bolted to said clutch connected shaft, a counter shaft mounted in said transmission housing, a gear cluster rotatably mounted on said counter shaft and having a gear in continuous mesh with said input gear, said input gear having clutch teeth on one end thereof, an axially shiftable gear splined to said tubular main shaft and having complementary clutch teeth engageable with the clutch teeth of said input gear, said axially shiftable gear being shiftable to neutral, to low speed engagement with the other gear of said gear cluster and to high speed clutched engagement with the clutch teeth of said input gear, a second gear cluster rotatably mounted on said counter shaft, a reverse idler counter shaft in said transmission housing, a reverse idler gear cluster rotatably mounted on said reverse idler counter shaft and having one gear in constant mesh with one gear of said second gear cluster, a second axially shiftable gear splined to said tubular shaft, said second axially shiftable gear having gear teeth bevel ended at both ends and axially shiftable to neutral, to forward in meshing engagement with said one gear of said second gear cluster and to reverse in meshing engagement with the other gear of said reverse idler gear cluster, a transmission output pinion gear shaft, a gear non-rotatably splined to said output pinion gear shaft and in constant mesh with the other gear of said second gear cluster.

3. In the vehicle drive train defined in claim 2, differential equipped drive axle detachably bolted to the front of said transmission housing, and the pinion gear of said output shaft meshing with the axle differential case drive gear.

4. In the vehicle drive train defined in claim 3, a brake assembly mounted on the other end of said transmission housing from said axle and having a brake drum non-rotatably secured to said transmission output shaft externally of said transmission housing.

5. A vehicle drive train comprising an engine driven torque converter, a disk type friction clutch having a driving member connected to the output of said torque converter and an output member, a serially arranged change speed and reverse drive transmission providing a plurality of forward and a plurality of reverse drive ratios and having a tubular input shaft coaxial with said clutch and torque converter, and a drive shaft forming a separable drive connection between said tubular shaft and said clutch output member, said drive shaft extending through said tubular shaft, being splined to said clutch output member and tubular shaft by splines of identical form, and being piloted in said clutch input member and said torque converter, said drive shaft being axially movable in a direction from said clutch and torque converter independently of said tubular shaft sufficiently to permit removal and servicing of said clutch.

6. In a vehicle drive train, an engine driven flywheel, a clutch, including a clutch output member, and a transmission assembled and connected in close coupled relationship; a tubular input shaft in said transmission; a clutch output shaft non-rotatably splined at one end to the clutch output member; said clutch output shaft being of greater length than said tubular shaft, being telescoped within said tubular shaft and projecting from opposite ends thereof; means at the end of said clutch output shaft remote from said clutch for releasably connecting said clutch output shaft to said tubular shaft externally of said tubular shaft, and a transmission housing having an opening adjacent said clutch output shaft end to provide access to said means for releasing the connection between said shafts and disengaging said clutch shaft from said clutch member without disturbing the transmission assembly.

7. In combination, a close coupled vehicle drive train; an engine driven flywheel; a housed transmission; a selectively actuated disc type friction clutch interposed between said flywheel and the input to said transmission; said transmission having a rotatably mounted hollow input member concentric with said clutch; a shaft of greater length than said hollow input member extending through said input member and splined at one end to the output member of said clutch; and means releasably connecting said shaft to said transmission input member at the other end of said shaft remote from said clutch; the housing of said transmission having an opening therein adjacent said shaft other end to provide access to said releasable means to permit manipulation of said releasable means and withdrawal of said shaft from its splined connection with the output member of said clutch.

8. The combination defined in claim 7 wherein said shaft other end has a radially extending peripherally apertured flange thereon, said input member has a plurality of threaded apertures in the end thereof aligned with the peripheral apertures of said flange and said releasable means comprises a plurality of bolts extending through the flange peripheral apertures and threadedly engaged with the input member threaded apertures.

9. In combination, a close coupled vehicle drive train; an engine driven flywheel; a sealed housed transmission; a selectively actuated disc type friction clutch interposed between said flywheel and the input of said transmission; said transmission having a rotatably mounted hollow input member concentric with said clutch; a shaft of greater length than said hollow input member, extending through said input member, and splined at one end to the output member of said clutch; means releasably connecting said shaft to said transmission input member at the other end of said shaft remote from said clutch; the housing of said transmission having an opening therein adjacent said shaft other end to provide access to said releasable means to permit manipulation of said releasable means and withdrawal of said shaft from its splined connection with the output member of said clutch; and means forming a seal between said housing and said transmission input member adjacent said releasable means whereby the sealed integrity of said transmission housing is maintained during removal of said shaft.

References Cited in the file of this patent

UNITED STATES PATENTS

| | | |
|---|---|---|
| 1,821,127 | Vandeveer | Sept. 1, 1931 |
| 1,903,914 | Parrett | Apr. 18, 1933 |
| 2,188,403 | Frisby | Jan. 30, 1940 |
| 2,627,189 | McFarland | Feb. 3, 1953 |